United States Patent
Inoue et al.

(10) Patent No.: US 11,042,337 B2
(45) Date of Patent: Jun. 22, 2021

(54) PRINT IMAGE CONTROL DEVICE, METHOD AND COMPUTER PRODUCT FOR PROJECTING AN OVERLAP DELETED PRINT IMAGE ONTO AN OBJECT TO BE PRINTED

(71) Applicant: BROTHER KOGYO KABUSHIKI KAISHA, Nagoya (JP)

(72) Inventors: Chisato Inoue, Nagoya (JP); Takeshi Watanabe, Nagoya (JP)

(73) Assignee: BROTHER KOGYO KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/832,943

(22) Filed: Mar. 27, 2020

(65) Prior Publication Data
US 2020/0314260 A1 Oct. 1, 2020

(30) Foreign Application Priority Data

Mar. 29, 2019 (JP) .............................. JP2019-067470
Mar. 29, 2019 (JP) .............................. JP2019-067472

(Continued)

(51) Int. Cl.
*G06F 3/12* (2006.01)
*H04N 1/00* (2006.01)
(Continued)

(52) U.S. Cl.
CPC ............ *G06F 3/125* (2013.01); *G06F 3/1204* (2013.01); *G06F 3/1208* (2013.01);
(Continued)

(58) Field of Classification Search
CPC ........... H04N 1/00249; H04N 1/00251; H04N 1/00267; H04N 1/00411; H04N 1/00413;
(Continued)

(56) References Cited

U.S. PATENT DOCUMENTS 6,323,876 B1 * 11/2001 Rao ..................... G06K 9/00442
345/634
8,978,551 B2 * 3/2015 Miller ................... B41J 3/4073
101/35

(Continued)

FOREIGN PATENT DOCUMENTS

| EP | 2843933 A1 | 3/2015 |
| JP | 2005-045644 A | 2/2005 |

(Continued)

OTHER PUBLICATIONS

New U.S. patent application claiming priority to JP Applications No. 2019-067470, 2019-067472, 2019-067482, 2019-067486 and 2019-067493, being filed concurrently with the United States Patent and Trademark Office.

(Continued)

*Primary Examiner* — Scott A Rogers
(74) *Attorney, Agent, or Firm* — K&L Gates LLP

(57) ABSTRACT

A CPU of a PC executes display control processing that displays, on a display, a print image superimposed on a photographic image of a fabric captured by a camera, specified area processing that specifies, as a specified area, a predetermined area of the photographic image, and overlap deleted print image formation processing that forms an overlap deleted print image obtained by deleting an overlapping section from the print image that overlaps the specified area. The CPU projects the overlap deleted print image onto an object to be printed.

19 Claims, 22 Drawing Sheets

(30) Foreign Application Priority Data

Mar. 29, 2019 (JP) .............................. JP2019-067482
Mar. 29, 2019 (JP) .............................. JP2019-067486
Mar. 29, 2019 (JP) .............................. JP2019-067493

(51) Int. Cl.
*H04N 1/60* (2006.01)
*G06K 15/02* (2006.01)
*B41J 3/407* (2006.01)

(52) U.S. Cl.
CPC .......... *G06F 3/1242* (2013.01); *G06F 3/1256* (2013.01); *G06F 3/1284* (2013.01); *H04N 1/00251* (2013.01); *H04N 1/00267* (2013.01); *H04N 1/00442* (2013.01); *H04N 1/00474* (2013.01); *H04N 1/6097* (2013.01); *B41J 3/4078* (2013.01); *G06K 15/021* (2013.01); *H04N 1/0019* (2013.01); *H04N 1/00204* (2013.01); *H04N 2201/0084* (2013.01)

(58) Field of Classification Search
CPC ............. H04N 1/0044; H04N 1/00442; H04N 1/00458; H04N 1/00466; H04N 1/00474; H04N 1/00482; H04N 1/38; H04N 1/387; H04N 1/54; H04N 1/60; H04N 1/6097; G06F 3/1203; G06F 3/1204; G06F 3/1208; G06F 3/1242; G06F 3/1243; G06F 3/125; G06F 3/1252; G06F 3/1253; G06F 3/1256; G06F 3/1257

See application file for complete search history.

(56) References Cited

U.S. PATENT DOCUMENTS

| | | | |
|---|---|---|---|
| 9,070,055 B2 * | 6/2015 | Miller | ...................... B41J 29/38 |
| 9,254,640 B2 * | 2/2016 | Miller | ................... B41F 17/006 |
| 9,667,822 B2 | 5/2017 | Kaieda | |
| 9,858,511 B2 * | 1/2018 | Yamashita | ......... G06K 15/1843 |
| 10,357,962 B2 * | 7/2019 | Miller | ...................... A43B 1/04 |
| 2004/0239705 A1 | 12/2004 | Arikita | |
| 2014/0029030 A1 | 1/2014 | Miller | |
| 2016/0292546 A1 | 10/2016 | Yamashita et al. | |
| 2020/0310703 A1 * | 10/2020 | Inoue | ................. H04N 1/00267 |

FOREIGN PATENT DOCUMENTS

| | | |
|---|---|---|
| JP | 2006-076099 A | 3/2006 |
| JP | 2013-023777 A | 2/2013 |
| JP | 2016-107474 A | 6/2016 |
| JP | 2016-177731 A | 10/2016 |
| JP | 6206282 B2 | 10/2017 |

OTHER PUBLICATIONS

Extended European Search Report issued in EP Application No. 20162774.9, dated Sep. 1, 2020.

Non-Final Office Action dated Feb. 10, 2021 in corresponding U.S. Appl. No. 16/832,929.

* cited by examiner

MOVE PRINT IMAGE (STAR)

PRINT IMAGE CONTROL DEVICE, METHOD AND COMPUTER PRODUCT FOR PROJECTING AN OVERLAP DELETED PRINT IMAGE ONTO AN OBJECT TO BE PRINTED

CROSS-REFERENCE TO RELATED APPLICATION

This application claims priority to Japanese Patent Application No. 2019-67470 filed Mar. 29, 2019, Japanese Patent Application No. 2019-67472 filed Mar. 29, 2019, Japanese Patent Application No. 2019-67482 filed Mar. 29, 2019, Japanese Patent Application No. 2019-67486 filed Mar. 29, 2019, and Japanese Patent Application No. 2019-67493 filed Mar. 29, 2019. The contents of the foregoing application are hereby incorporated herein by reference.

BACKGROUND

The present disclosure relates to a non-transitory computer-readable medium, a print image control device, and a control method of a print image control device.

A projection system is proposed in which a projector is provided on a printer, and a print image to be formed on an object to be printed can be verified using an image projected onto the object to be printed.

SUMMARY

There are cases in which it is not necessary to print the whole of a print image, and, depending on a section of the print image, some sections need not necessarily be printed. However, in a known projection system, the print image is projected onto an object to be printed using data of a projection position of the print image and data of a projection scale factor. Thus, there is a problem that sections that do not need to be printed are also projected onto the object to be printed, and it becomes difficult to verify an image for printing. Further, it takes time for a user to perform an operation to adjust the position of the print image so as to eliminate sections extending beyond a print region, and there is a problem that productivity deteriorates.

Embodiments of the broad principles derived herein provide a non-transitory computer-readable medium, a print image control device, and a control method of a print image control device capable of reducing time of an operation to verify an image for printing of a print image on an object to be printed, and improving productivity.

A non-transitory computer-readable medium according to a first aspect of the present disclosure stores computer-readable instructions that cause a processing of a print image control device, which performs control causing image capture by an image capture device of an object to be printed supported on a support member of a printer, and causing projection from a projection device of a print image onto the object to be printed, to perform processes including: performing display control processing that displays, on a display portion, the print image superimposed on a photographic image, captured by the image capture device, of the object to be printed; performing specified area processing that specifies, as a specified area, a predetermined area of the photographic image displayed on the display portion; performing overlap deleted print image formation processing that forms an overlap deleted print image obtained by deleting an overlapping section from the print image overlapping the specified area; and performing projection control processing that causes the projection device to project the overlap deleted print image onto the object to be printed.

In this case, on the print image displayed so as to be superimposed on the photographic image on the display portion, a section that does not need to be printed is specified as the specified area, the overlap deleted print image, which is obtained by deleting the overlapping section from the print image overlapping the specified area, is created, and the overlap deleted print image is projected. Thus, the image for printing can be easily verified, and time required for a verification operation of a position of the print image can be reduced. Further, there is no need to re-create the print image from which the section that does not need to be printed is deleted, and a deterioration in productivity can be reduced.

A print image control device according to a second aspect of the present disclosure, which performs control causing image capture by an image capture device of an object to be printed supported on a support member of a printer, and causing projection from a projection device of a print image onto the object to be printed, includes a control portion. The control portion performs processes including: performing display control processing that displays, on a display portion, the print image superimposed on a photographic image, captured by the image capture device, of the object to be printed; performing specified area processing that specifies, as a specified area, a predetermined area of the photographic image displayed on the display portion; performing overlap deleted print image formation processing that forms an overlap deleted print image obtained by deleting an overlapping section from the print image overlapping the specified area; and performing projection control processing that causes the projection device to project the overlap deleted print image onto the object to be printed.

A control method of a print image control device according to a third aspect of the present disclosure causes a control portion of a print image control device, which performs control causing image capture by an image capture device of an object to be printed supported on a support member of a printer, and causing projection from a projection device of a print image onto the object to be printed, to perform processes including: performing display control processing that displays, on a display portion, the print image superimposed on a photographic image, captured by the image capture device, of the object to be printed; performing specified area processing that specifies, as a specified area, a predetermined area of the photographic image displayed on the display portion; performing overlap deleted print image formation processing that forms an overlap deleted print image obtained by deleting an overlapping section from the print image overlapping the specified area; and performing projection control processing that causes the projection device to project the overlap deleted print image onto the object to be printed.

BRIEF DESCRIPTION OF THE DRAWINGS

Embodiments will be described below in detail with reference to the accompanying drawings in which.

DETAILED DESCRIPTION

Figure 1:
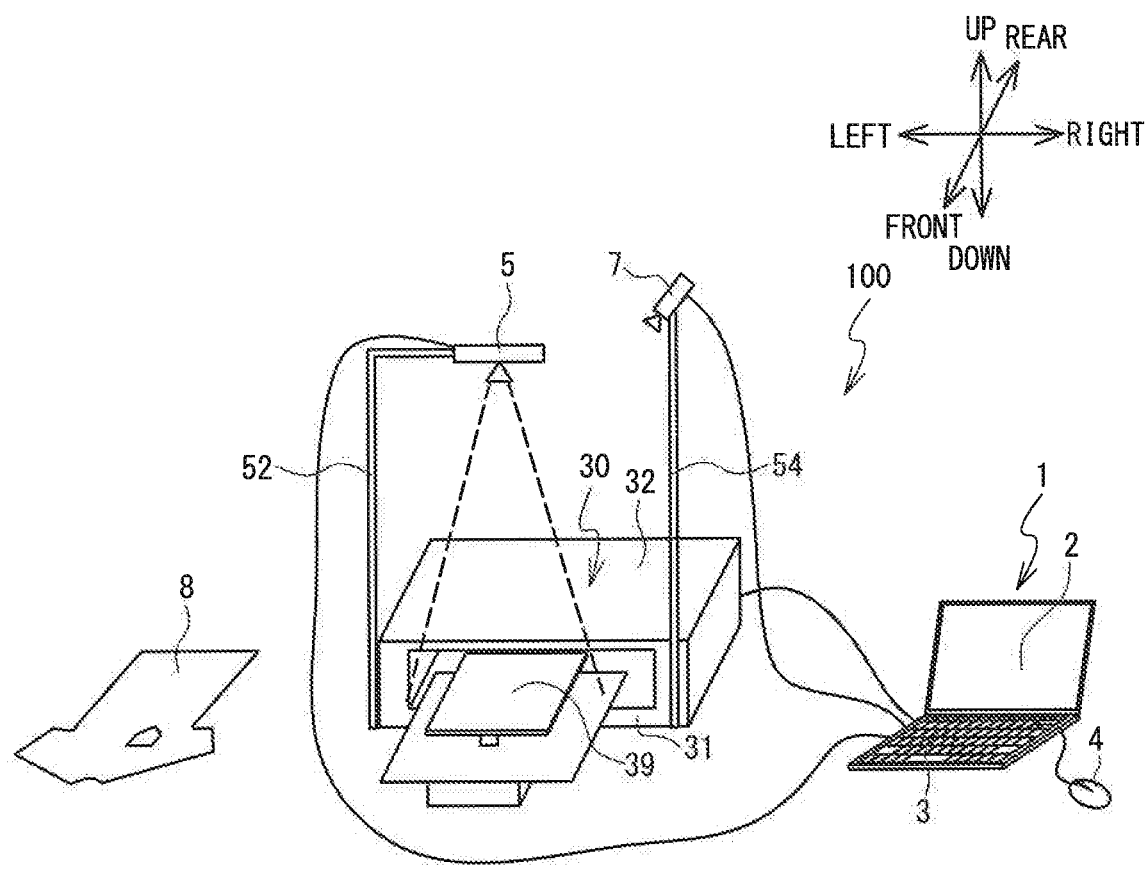
FIG. 1 is a diagram showing an overview of a print image system 100.

As shown in FIG. 1, a print image system 100 is provided with a personal computer (hereinafter referred to as a "PC") 1 (refer to FIG. 3), a projector 5, and a camera 7. The PC 1 controls a printer 30 as well as supplying data of a print image to the printer 30. The PC 1 can create projection data. The projection data is data to project a projection image representing an image for printing onto an object to be printed on which the print image is to be formed by the printer 30. A photographic image captured by the camera 7 is input to the PC 1, and creates a generated image to be described later.

The printer 30 performs printing by ejecting ink supplied from a cartridge (not shown in the drawings) from a head 35 (refer to FIG. 2) onto the object to be printed, which is paper, a fabric 8 such as a T-shirt, or the like. The upward direction, the downward direction, the rightward direction, the leftward direction, the upper right direction, and the lower left direction in FIG. 1 respectively correspond to an upward direction, a downward direction, a leftward direction, a rightward direction, a rear direction, and a front direction of the printer 30.

The printer 30 is provided with a substantially cuboid-shaped main body portion 32, a base 31, and a cartridge mounting portion (not shown in the drawings) in which a cartridge (not shown in the drawings) is mounted. The main body portion 32 is a known portion that performs printing by causing scanning of the ink head 35 while conveying a platen 39 on which the fabric 8 is placed. The base 31 is a portion forming a base of a lower portion of the printer 30.

The platen 39 is provided in a center portion, in the left-right direction, of the main body portion 32. The platen 39 is provided with a placement surface on the upper surface thereof, on which the fabric 8 is placed. The platen 39 is conveyed in the front-rear direction by a sub-scanning motor 47 (refer to FIG. 2). The placement surface of the platen 39 is positioned in a location separated from the base 31.

The projector 5, which is a projection device, is supported by a support portion 52, above and on the front side of the main body portion 32. The projector 5 may be a general-purpose projector. The projector 5 is provided so as to be able to project the projection image onto the object to be printed placed on the platen 39. FIG. 1 shows a state in which the projection image is projected onto the platen 39 from the projector 5. The support portion 52 supports the projector 5 above the upper surface of the platen 39. As will be described in more detail later, the projector 5 and the upper surface of the platen 39 are separated such that a projection region over which the projection image is projected onto the platen 39 by the projector 5 is larger than the print image that can be formed on the object to be printed by the printer 30. The projector 5 projects the projection image from diagonally above the object to be printed, and thus, as processing performed by the projector 5, it is assumed that processing to correct image distortion is performed on the projection image.

The camera 7, which is an image capture device, is supported by a support portion 54, above and on the front side of the right end side of the main body portion 32. The camera 7 may be a general-purpose digital camera or the like. The camera 7 is positioned in a location separated from the base 31 of the printer 30, and is provided facing the platen 39 supporting the fabric 8, and is able to capture an image of the object to be printed placed on the platen 39. The camera 7 can acquire the photographic image.

Electrical Configuration of Printer 30

Figure 2:
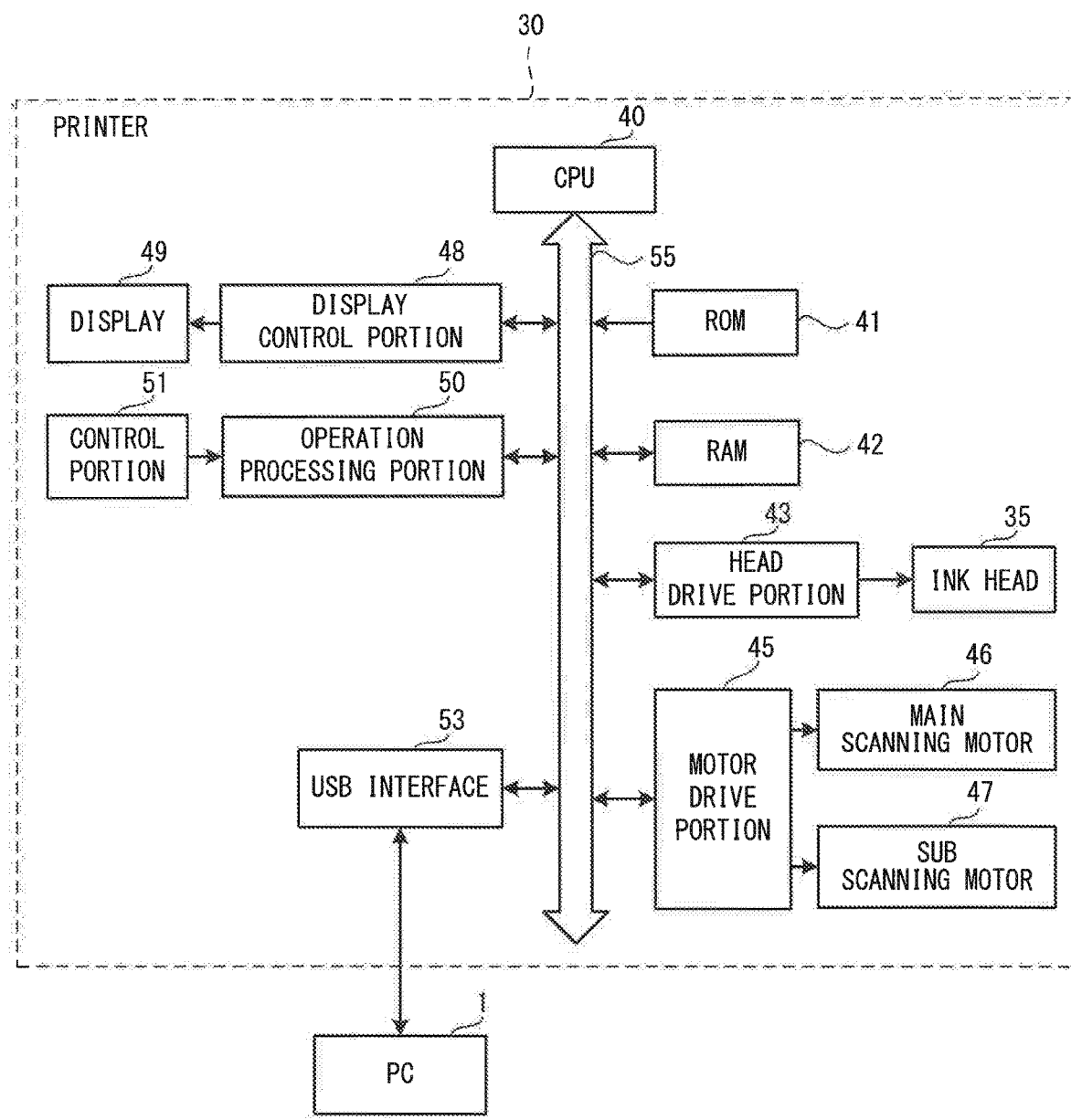
FIG. 2 is a block diagram showing an electrical configuration of a printer 30.

An electrical configuration of the printer 30 will be explained with reference to FIG. 2. The printer 30 is provided with a CPU 40 that controls the printer 30. A ROM 41, a RAM 42, a head drive portion 43, a motor drive portion 45, a display control portion 48, an operation processing portion 50, and a USB interface 53 are electrically connected to the CPU 40 via a bus 55.

The ROM 41 stores a control program, initial values and the like that are used to control operations of the printer 30. The RAM 42 temporarily stores various data that are used in the control program, and print image data and the like received from the PC 1. The head drive portion 43 is electrically connected to the ink head 35 that ejects the ink, and drives piezoelectric elements provided in each of ejection channels of the ink head 35. The motor drive portion 45 drives a main scanning motor 46 that moves the ink head 35 in a main scanning direction, and a sub-scanning motor 47 that moves the platen 39 in a sub-scanning direction with respect to the ink head 35. The display control portion 48 controls display of a display 49 in accordance with instructions by the CPU 40. The operation processing portion 50 detects an operation input with respect to an operation portion 51. The USB interface 53 electrically connects the printer 30 to an external device, such as the PC 1.

An electrical configuration of the PC 1 will be explained with reference to FIG. 3. The PC 1 is provided with a CPU 10 that controls the PC 1. A ROM 11, a RAM 12, a CD-ROM drive 13, a hard disk drive (hereinafter referred to as an "HDD") 14, a display control portion 16, an operation processing portion 17, a projection data output portion 18, and a USB interface 19, are electrically connected to the CPU 10 via a bus 20.

The ROM 11 stores a program of a BIOS executed by the CPU 10. The RAM 12 temporarily stores various information and a print image layer group 70 to be described later. A CD-ROM 6 that is a recording medium is inserted into the CD-ROM drive 13. Data recorded on the CD-ROM 6 is read out by the CD-ROM drive 13. Via the CD-ROM 6, the Internet, and the like, the PC 1 acquires a printer driver program, a control program, projection image/print image creation processing programs, and the like, and stores the programs in the HDD 14. The HDD 14 is a non-volatile recording device, and stores various programs, tables necessary for processing, and the print image to be described later. The display control portion 16 controls display of a display 2. The operation processing portion 17 is electrically connected to a keyboard 3 and a mouse 4, and detects an operation input. The projection data output portion 18 is electrically connected to the projector 5 that projects the projection image, and outputs, to the projector 5, the data of the projection image created by the projection image/print image creation processing programs. The USB interface 19 electrically connects the PC 1 to external devices, such as the printer 30 and the camera 7, and the like. The CPU 10 receives the photographic image from the camera 7 via the USB interface 19. After the printer 30 receives the data of the print image from the PC 1, when the fabric 8 is placed on the platen 39 by the user and a print start button (not shown in the drawings) of the operation portion 51 is pressed, print processing is performed.

Figure 4:
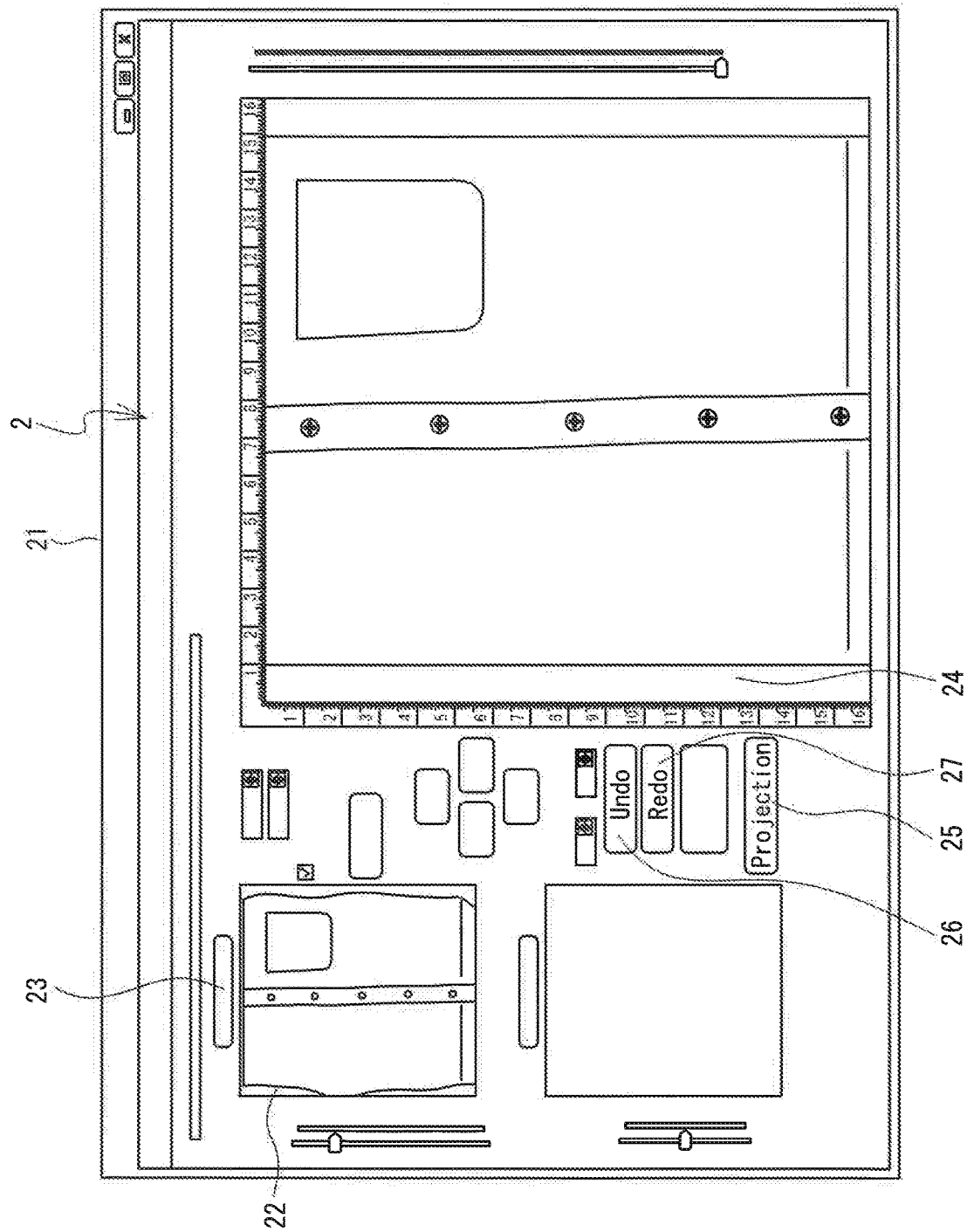
FIG. 4 is a diagram showing an editing screen 21.

As shown in FIG. 4, an editing screen 21 is displayed on the display 2 of the PC 1. A camera image display portion 22 that displays in image input from the camera 7, an image capture button 23 that instructs the camera 7 to perform the image capture and the like, an edit image display portion 24 on which an image being edited is displayed, a projection button 25 that instructs the projector 5 to perform projection, an Undo button 26, a Redo button 27, and the like are displayed on the editing screen 21.

Projection Image/Print Image Creation Processing

Figure 5:
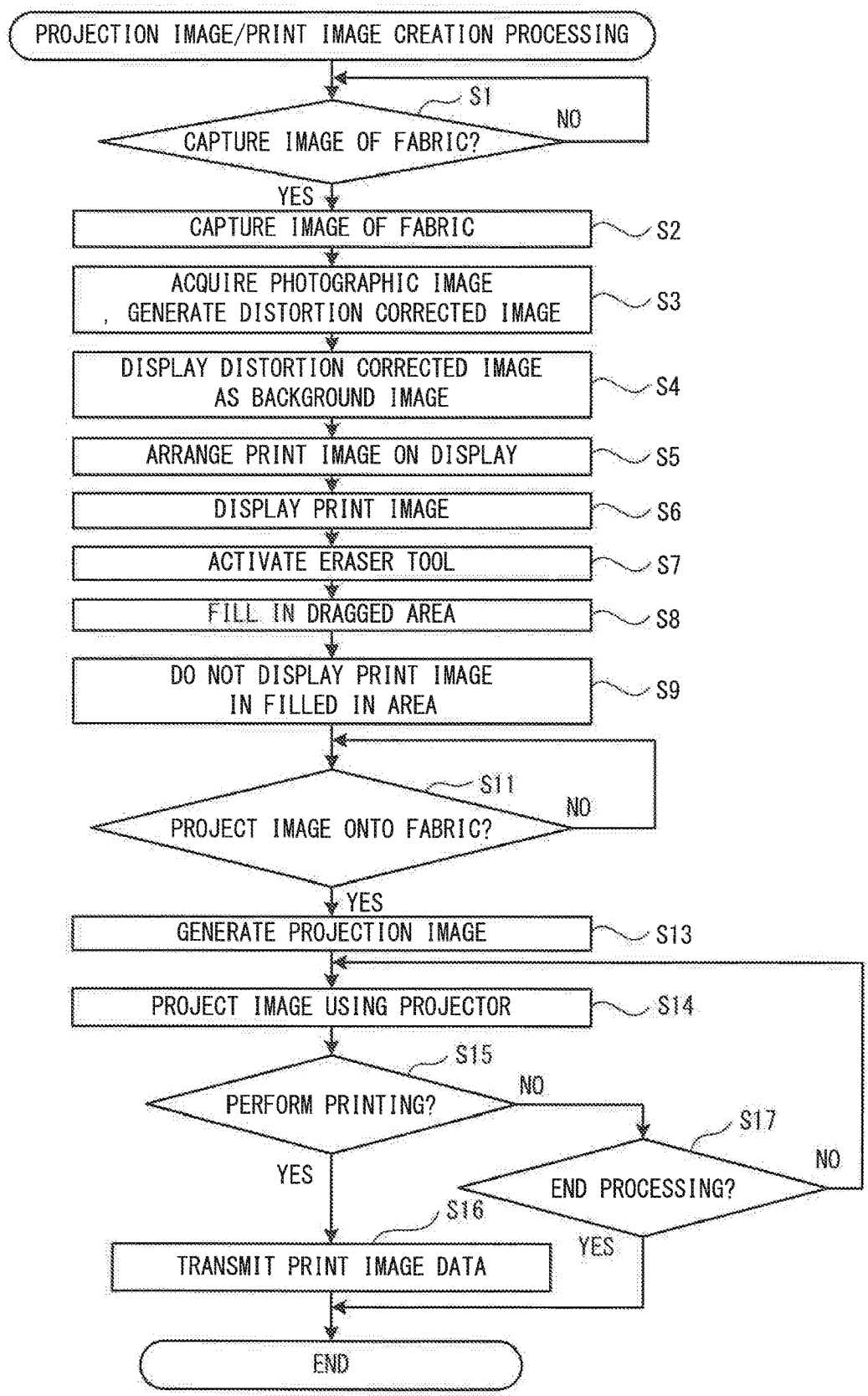
FIG. 5 is a flowchart of projection image/print image creation processing.

Next, projection image/print image creation processing executed by the CPU 10 of the PC 1 will be explained with reference to FIG. 5. In an example described below, a fabric sneaker is used as the fabric 8. The sneaker is hereinafter also referred to as a "fabric 81." Further, a platen 39A (refer to FIG. 7A to FIG. 7C) is a platen capable of supporting a left and right pair of the fabric 81. The platen 39A supports a portion of the fabric 81 formed in a hollow shape.

Figure 7A:
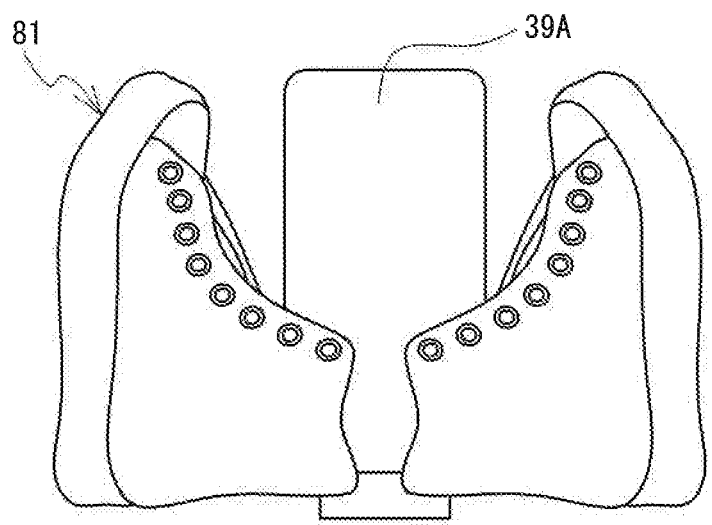
FIG. 7A to FIG. 7C are diagrams showing display content of a display 2.

When the CPU 10 detects that the image capture button 23 of the editing screen 21 shown in FIG. 4 has been touched (yes at step S1), the CPU 10 determines that there is an image capture command to capture the image of the fabric 81 (yes at step S1), and causes the camera 7 to capture the image of the fabric 81 placed on the platen 39 (step S2). At this time, irradiation from the projector 5 is paused. Next, the CPU 10 acquires the photographic image from the camera 7, and generates a distortion corrected image obtained by performing distortion correction on the photographic image (step S3). Note that the distortion correction processing is performed by image correction processing of a known program library for PC use. Next, as shown in FIG. 7A, the CPU 10 displays the photographic image, on which the distortion has been corrected, on the display 2 of the PC 1, as a background image (step S4).

Figure 6A:
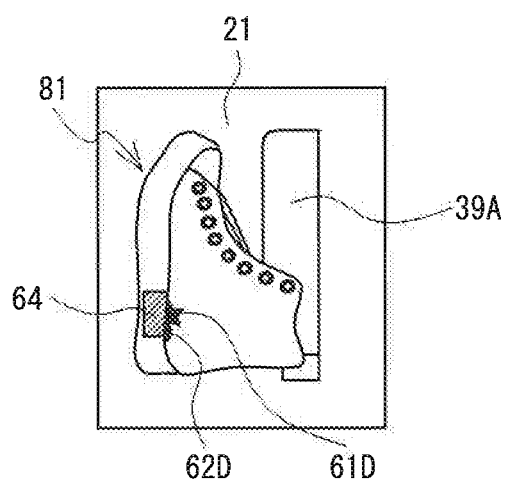
FIGS. 6A and 6B are perspective views showing display of a print image layer group 70.
Figure 6B:
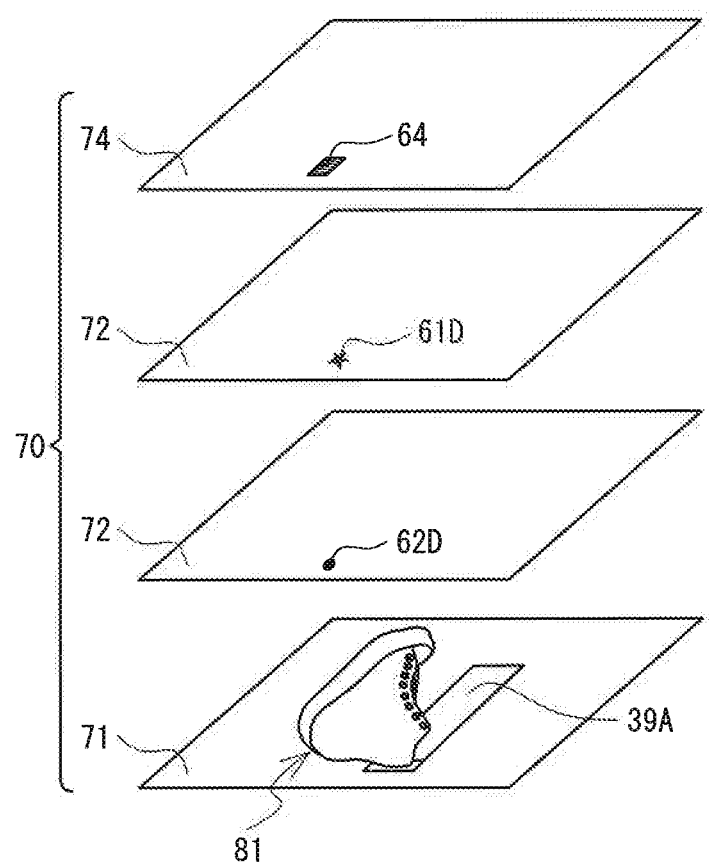

A print image layer group 70, which is a data structure used in the projection image/print image creation processing, will be explained with reference to FIG. 6A and 6B. The print image layer group 70 shown in FIG. 6B includes a background image layer 71, print image layers 72, and a specified area layer 74. The print image layer 72 is arranged on top of the background image layer 71, and the specified area layer 74 is positioned on top of the print image layer 72. The background image layer 71 includes the background image, the print image layer 72 includes the print image, and the specified area layer 74 includes a specified area 64 specified by the user, which will be described in detail later. The data of the print image included in the print image layer 72 is stored in the HDD 14. The print image layer group 70 may contain the plurality of print image layers 72, and in FIG. 6B, the two print image layers 72 are included in the print image layer group 70. The print image layer group 70 is stored in the RAM 12. FIG. 6A shows an image displayed on the screen 21 of the display 2. In the image displayed on the display 2, the background image, the print images, and a specified area image are arranged in that order from the bottom, in accordance with the print image layer group 70.

Figure 7B:
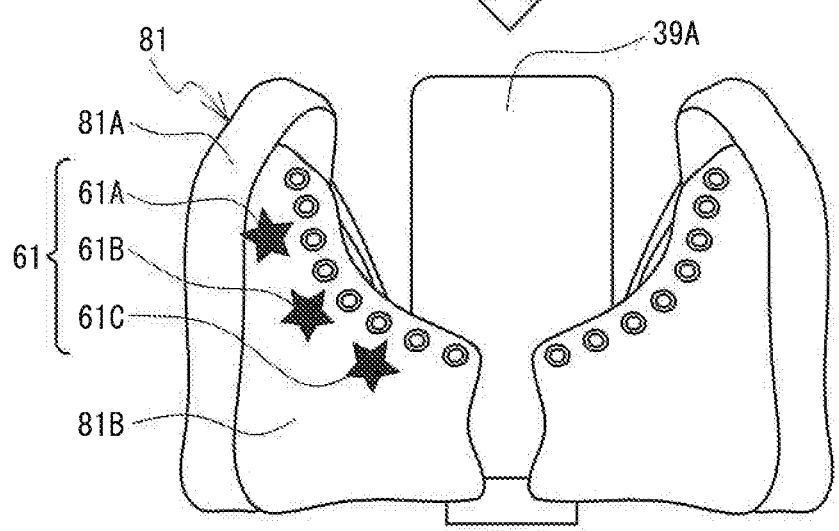
Figure 7C:
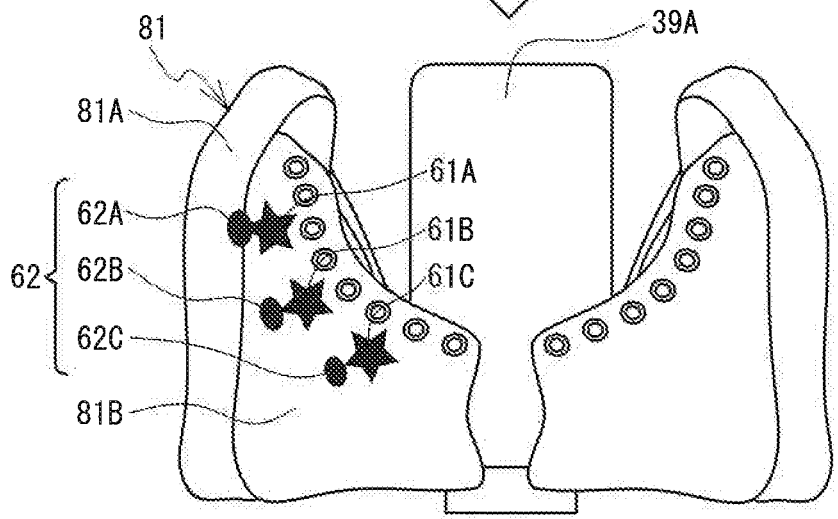

Next, the CPU 10 acquires the data of the print image from the HDD 14 and arranges the print image on the display 2 (step S5). At this time, the print image is arranged in a desired position, and thus, the user uses a cursor or the like of the mouse 4, and moves and arranges the print image to the desired position on the background image. The CPU 10 prioritizes the print image over the background image, and displays the print image so as to be superimposed on the background image on the display 2 (step S6). FIG. 7B shows a state in which stars 61A to 61C are arranged on the background image as the print image. FIG. 7C shows a state in which, along with the stars 61A to 61C, ellipses 62A to 62C are arranged on the background image as the print image.

Figure 8A:
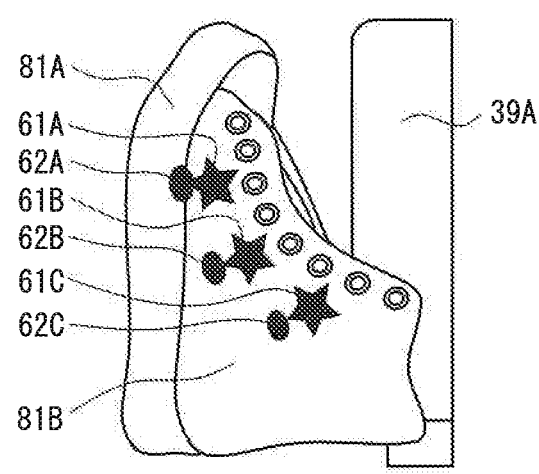
FIG. 8A and FIG. 8B are diagrams showing display content of the display 2.
Figure 8B:
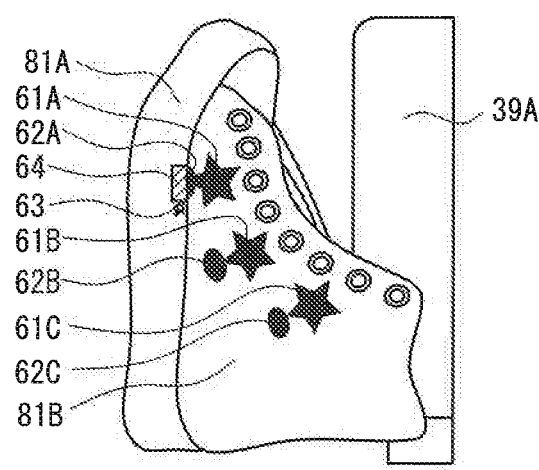

Next, when the user has instructed activation of an eraser tool of the PC 1, the CPU 10 activates the eraser tool (step S7). The eraser tool has the same function as an eraser tool of a known image processing software. FIG. 8A shows an image displayed on the screen 21 of the display 2. As shown in FIG. 8A, the fabric 81 is configured by a rubber sole 81A and a fabric portion 81B. Masking tape is adhered to the sole 81A. The sole 81A is an area on which printing is not performed, but a part of the ellipse 62A that is the print image is arranged on the sole 81A. Thus, as shown in FIG. 8B, using the mouse 4, the user drags an eraser tool icon 63 over the area the user wishes to erase. Using a predetermined color, the CPU 10 fills the specified area 64 over which the dragging has been performed following a trajectory of the icon 63 (step S8). In the processing at step S8, the CPU 10 generates image data of the specified area 64. Image data of the specified area 64 includes information about a planar position of the specified image 64.

The CPU 10 causes the image of the specified area 64 to be the image of the topmost specified area layer 74 (refer to FIG. 6B) of the print image layer group 70. From the print image overlapping with the image of the specified area 64, the CPU 10 generates an overlap deleted print image from which an overlapping area is deleted (step S9). Thus, as shown in FIG. 8B, as a result of the filled specified area 64, a part of the ellipse 62A that is the print image is not displayed on the display 2 (step S9).

Figure 9A:
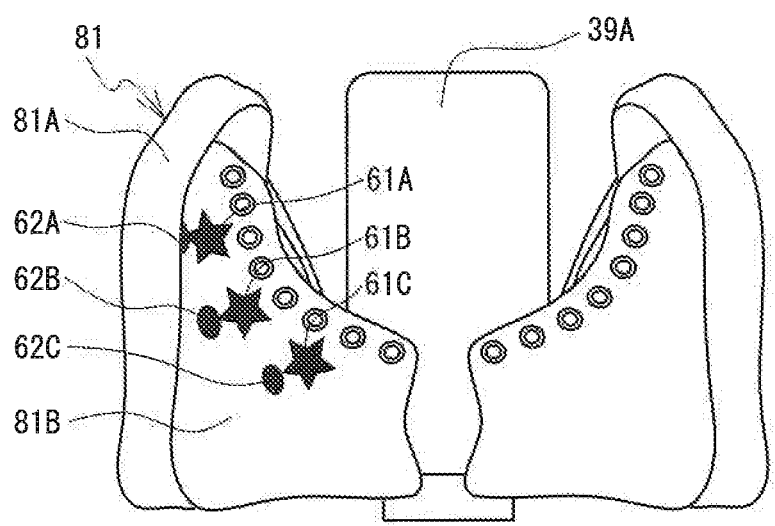
FIG. 9A is a diagram showing a state in which a projection image is projected onto a fabric 81 supported on a platen 39A.
Figure 9B:
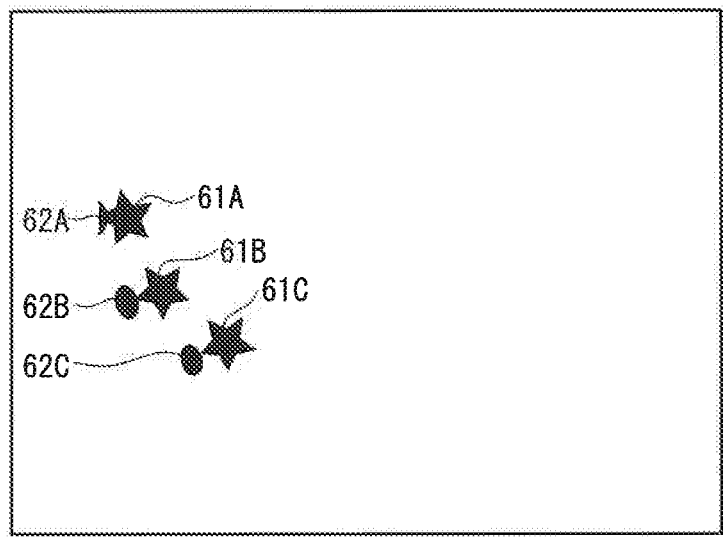
FIG. 9B is a diagram showing an example of the projection image.

Next, when the projection button 25 of the editing screen 21 shown in FIG. 4 is clicked (yes at step S11), the CPU 10 generates the projection image on the basis of the print image layer group 70 stored in the RAM 12, (step S13). The print image layer 72 includes information about the planar position of the print image, and the specified area layer 74 includes the information about the planar position of the specified area 64. From the print image of the print image layer 72 overlapping with the image of the specified area 64 of the specified area layer 74, the CPU 10 generates, as the projection image, the overlap deleted print image from which the overlapping portion is deleted. In the processing at step S13, the CPU 10 performs planar position extraction processing that extracts the planar position of the overlap deleted print image in the background image. On the basis of the planar position extracted by the planar position extraction processing, the overlap deleted print image that is the projection image is generated such that the specified area 64 exposes the background image. The photographic image of the fabric 81 captured by the camera 7 becomes the background image of the background image layer 71 that has been distortion corrected. The background image is a two-dimensional planar image. The print image from which the overlapping portion, at which the print image of the print image layer 72 overlaps with the specified area 64 of the specified area layer 74, is deleted becomes the overlap deleted print image. The position of the overlap deleted print image on the background image of the background image layer 71 is the planar position. Position alignment is performed in advance to align coordinates of this planar position with coordinates of a planar position of the fabric 81 supported on the platen 39A. A position is determined, in a two-dimensional plane, of the projection image with respect to the fabric 81 onto which the overlap deleted print image is projected using information about the planar position of the overlap deleted print image. Next, the CPU 10 outputs the overlap deleted print image as the projection image, from the projection data output portion 18 to the projector 5. As shown in FIG. 9A, the projector 5 projects the projection image onto the fabric 81 supported by the platen 39A (step S14). In the processing at step S14, the CPU 10 outputs, to the projector 5, a section of the specified area 64 as data of a white image. FIG. 9B shows an example of the overlap deleted print image that is the projection image. The CPU 10 controls the projector 5, irradiates white light onto the specified area 64 of the fabric 81, and projects the overlap deleted print image onto the fabric 81. Note that in the processing at step S8, the specified area 64 is filled and specified by the user operating the mouse 4 and using the eraser tool icon 63 to drag over the area the user wishes to erase. Thus, the specified area 64 is specified by the trajectory of the icon 63. The section of the specified area 64 is the data of the white color image. In the processing at step S14, the CPU 10 controls the projector 5, irradiates an area corresponding to the specified area 64 of the fabric 81, that is, the section following drawing of the trajectory of the icon 63 when specifying the specified area 64, with white light, and projects the overlap deleted print image onto the fabric 81.

Figure 3:
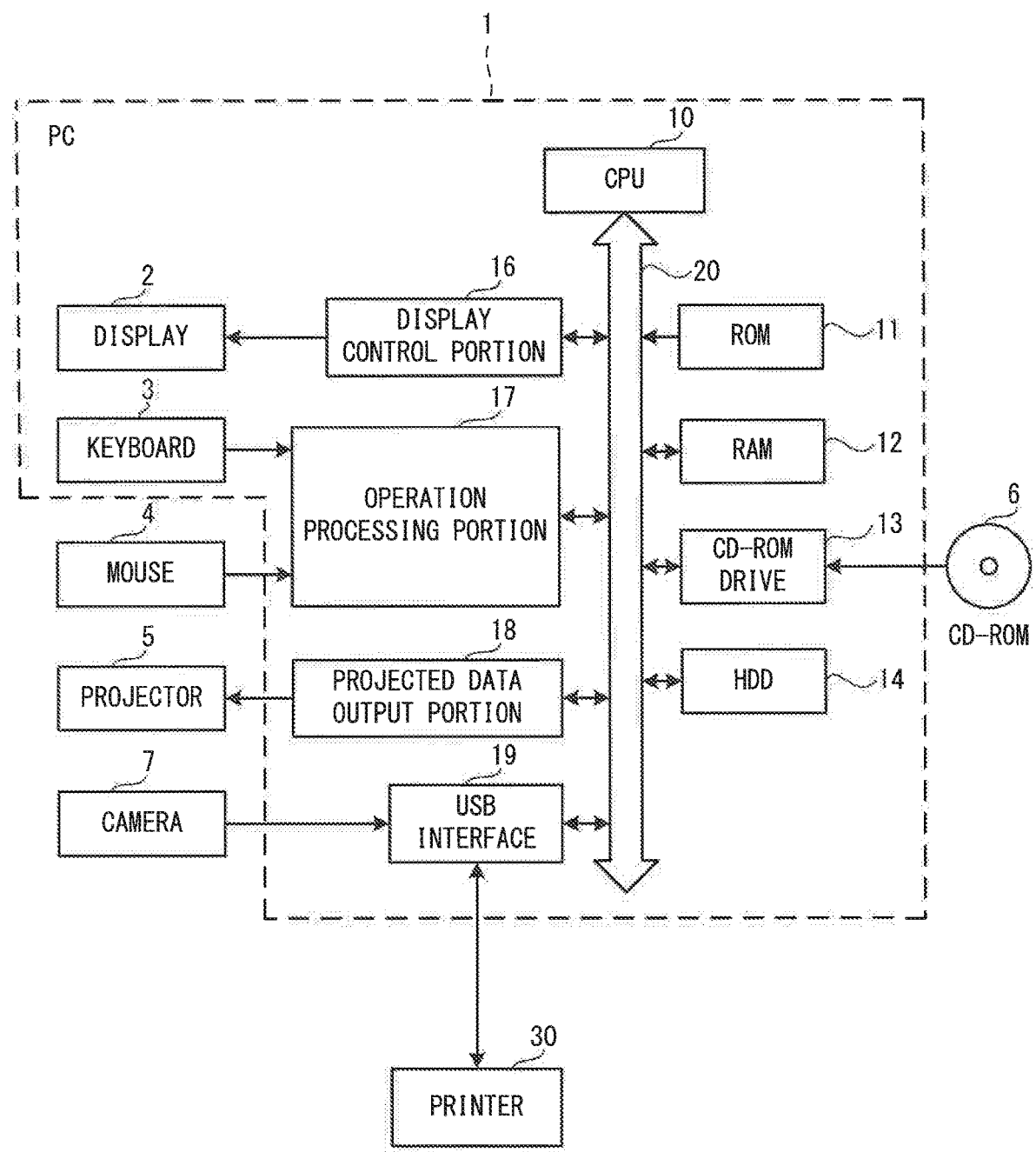
FIG. 3 is a block diagram showing an electrical configuration of a PC 1.

Next, when the CPU 10 determines that the keyboard 3 or the mouse 4 shown in FIG. 3 is operated and there is a printing command, the CPU 10 transmits, to the printer 30, the overlap deleted print image generated on the basis of the print image of the print image layer 72 and the specified area 64 of the specified area layer 74, as data of the print image (step S16). After that, the CPU 10 ends the processing. Further, when NO is determined at step S1, the CPU 10 returns the processing to step S1. Further, when NO is determined in the determination at step S11, the CPU 10 returns the processing to step S11. Further, when NO is determined in the determination at step S15, the CPU 10 determines whether there is an input to end the processing (step S17), and when there is the input to end the processing (YES at step S17), the CPU 10 ends the processing. Further, when NO is determined in the determination at step S17, the CPU 10 returns the processing to step S14.

Figure 10A:
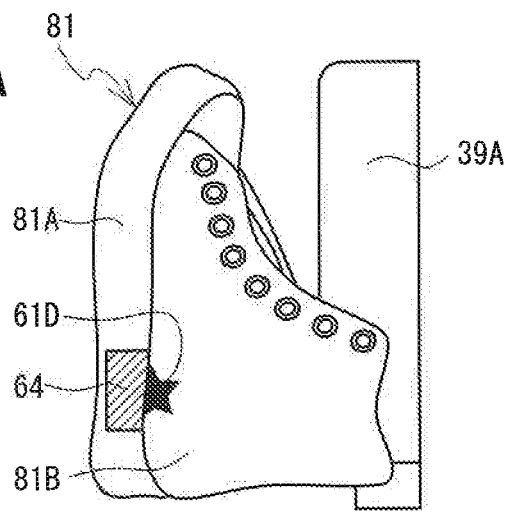
FIG. 10A and FIG. 10B are diagrams showing a case in which a specified area 64 does not move even if the print image is moved.
Figure 10B:
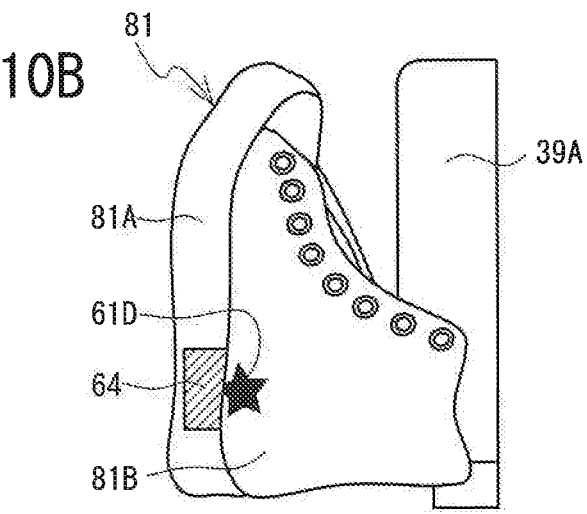
Figure 11:
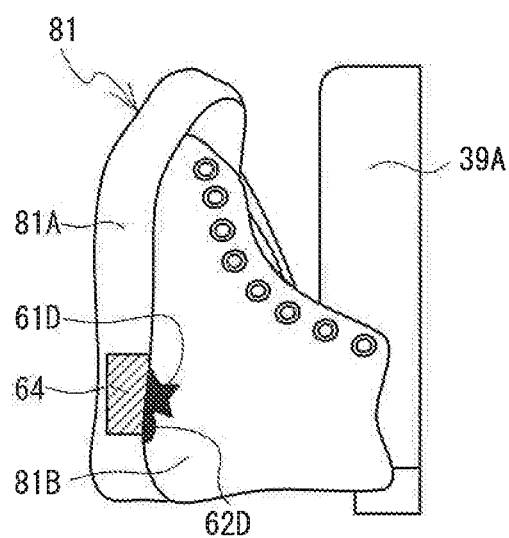
FIG. 11 is a diagram showing a case in which, even if the print image is added, it is arranged below the specified area 64.

In addition, at the time of the processing at step S9, or the processing at step S14, as shown in FIG. 10A and FIG. 10B, when the user has input a command, using the mouse 4, to move a star 61D that is the print image to an area other than the specified area 64, the CPU 10 performs movement processing that moves the star 61D to another area in accordance with the command. In this case, in the processing at step S9, the CPU 10 controls the display 2 so as to perform display while maintaining the planar position of the specified area 64 in the background image. Further, in the processing at step S14 also, the CPU 10 controls the projector 5 so as to project the overlap deleted print image onto the fabric 81 while maintaining the planar position of the specified area 64 in the background image. Further, even if a print image 62D is added after the specified area 64 has been specified, the print image layer 72 and a print image layer 73 are in a lower layer than the specified area layer 74, and thus, as shown in FIG. 11, the CPU 10 arranges the print image 62D below the specified area 64.

Figure 12A:
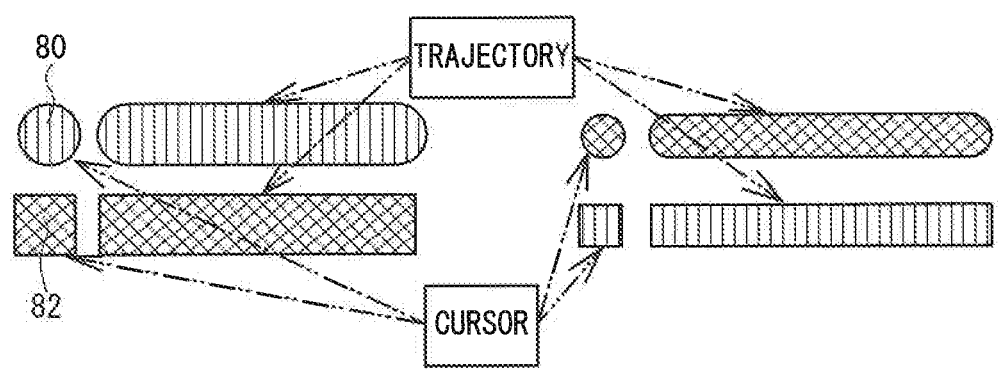
FIG. 12A and FIG. 12B are diagrams showing cursor shape setting processing, cursor trajectory thickness setting processing, and cursor trajectory same color setting processing.
Figure 12B:
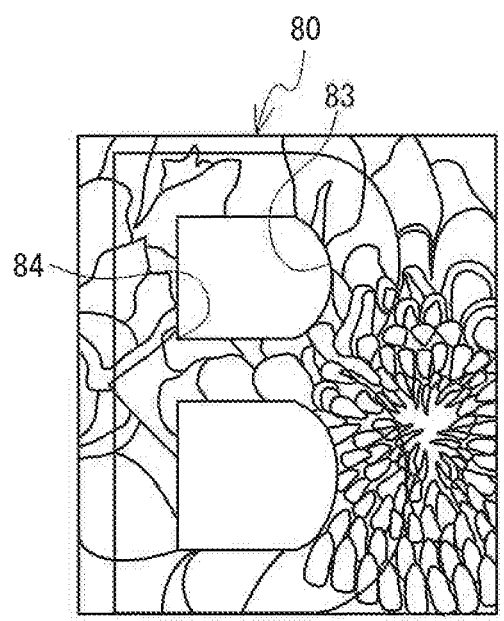
Figure 13A:
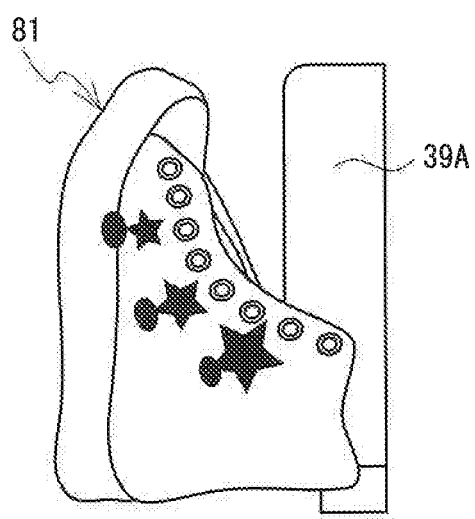
FIG. 13A is a diagram showing a state in which the print image is displayed on the fabric 81.
Figure 13B:
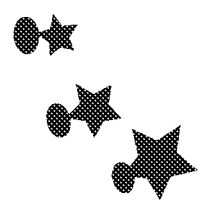
FIG. 13B is a diagram showing the projection image.
Figure 14A:
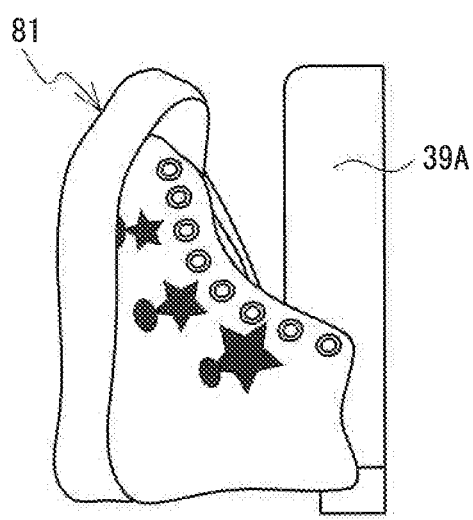
FIG. 14A is a diagram showing a state in which an overlap deleted print image is displayed on the fabric 81.
Figure 14B:
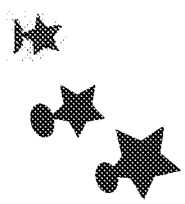
FIG. 14B is a diagram showing the projection image.
Figure 15A:
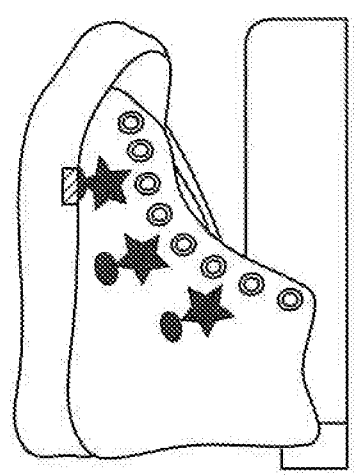
FIG. 15A is a diagram showing a state in which the specified area and the print image are displayed on the fabric 81.
Figure 15B:
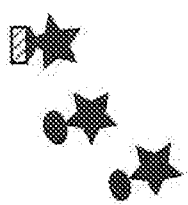
FIG. 15B is a diagram showing the projection image.

Next, cursor shape setting processing, cursor trajectory thickness setting processing, cursor trajectory color setting processing, cursor trajectory same color setting processing, specified area color setting processing, and trajectory basic shape setting will be explained with reference to FIG. 12A and FIG. 12B. When the CPU 10 detects that a cursor shape setting processing button (not shown in the drawings) has been clicked on the editing screen 21 shown in FIG. 4, the CPU 10 starts the cursor shape setting processing, and displays a cursor shape setting screen shown in FIG. 12A on the display 2. The user selects a desired cursor shape using a pointer of the mouse 4. Cursor shapes 80 are circles, and there are larger and smaller cursor shapes 80. Cursor shapes 82 are square, and there are larger and smaller cursor shapes 82. The CPU 10 stores the selected setting of the cursor shape, and displays the selected cursor shape. In other words, the CPU 10 diplays, on the display 2, the cursor of the shape set by the cursor shape setting processing. Further, the CPU 10 causes the projector 5 to project the cursor of the shape set by the cursor shape setting processing.

Next, the cursor trajectory thickness setting processing will be explained. In the above-described cursor shape setting processing, the cursor shape 80 and the cursor shape 82 can be set to be the larger or smaller cursor. When the larger cursor shape is selected, a trajectory basic shape of the cursor also becomes thicker. When the smaller cursor shape is selected, the trajectory basic shape of the cursor also becomes finer. Thus, by performing the cursor shape setting processing as the cursor trajectory thickness setting processing, in addition to the shape, the CPU 10 can specify the size of the cursor when drawing the trajectory. Further, the CPU 10 displays, on the display 2, the cursor of the thickness set by the cursor shape setting processing serving as the cursor trajectory thickness setting processing. Further, the CPU 10 causes the projector 5 to project the cursor of the thickness set by the cursor shape setting processing serving as the cursor trajectory thickness setting processing.

Next, the cursor trajectory color setting processing will be explained. In the cursor shape setting processing, when the CPU 10 detects that a color selection button (not shown in the drawings) displayed on the screen 21 of the display 2 has been clicked, the CPU 10 performs the cursor trajectory color setting processing, and displays a color selection screen (not shown in the drawings) on the display 2. When any one of colors is selected, the CPU 10 stores, in the HDD 14, the selected color as the color of the trajectory of the cursor, that is, as the color of the specified area 64, and sets the color as the color of the trajectory (of the specified area 64). At this time, as the cursor trajectory same color setting processing, the CPU 10 causes the color of the cursor of the eraser tool icon 63 and the color of the trajectory to be the same color. The CPU 10 displays, on the display 2, the trajectory of the cursor using the color set by the cursor trajectory color setting processing. Further, the CPU 10 causes the projector 5 to project the cursor of the color set by the cursor trajectory color setting processing. Further, the CPU 10 displays, on the display 2, the cursor and the trajectory of the cursor using the color set by the cursor trajectory same color setting processing. Further, the CPU 10 causes the projector 5 to project the cursor and the trajectory of the cursor using the color set by the cursor trajectory same color setting processing. As shown in FIG. 12B, in the case of a curved trajectory 83, a rounded-end cursor can draw smoothly. In the case of an angular or straight line trajectory 84, a square-ended cursor can draw neatly.

Further, the specified area color setting processing will be explained. There is a case in which a plurality of specified areas 64 are specified with respect to the single photographic image. When the CPU 10 detects that a color change button (not shown in the drawings) for the specified area 64 displayed on the screen 21 of the display 2 has been clicked, the CPU 10 performs the specified area color setting processing, and displays a color selection screen (not shown in the drawings) on the display 2. When any one of colors is selected, the CPU 10 sets the selected color to the same color for the color of the plurality of specified areas 64, and stores the color in the HDD 14. The CPU 10 displays the plurality of specified areas 64 on the display 2, using the color set by the specified area color setting processing. Further, the CPU 10 causes the projector 5 to project the plurality of specified areas 64 using the color set by the specified area color setting processing. This is because colors that are easy to see differ depending on the section of the object to be printed, and, further, it becomes complex when the specified areas 64 are configured by a plurality of colors.

Further, as one operation sequence configured by "left click mouse 4→drag →release left click of mouse 4," the CPU 10 stores planar position data, in the background image, of each of the print image, the specified area 64, and the overlap deleted print image, in the HDD 14 such that the data can be read and edited. States of a plurality of stages relating to the specified area 64 are continuously stored in the HDD 14. Thus, when the Undo button 26 of the editing screen 21 is clicked once, the CPU 10 can read the position data from the HDD 14 as reading processing, and return the one operation sequence as Undo input processing, and when the Redo button 27 is clicked once, the CPU 10 can read the position data from the HDD 14 as the reading processing, and advance the one operation sequence as Redo input processing. Thus, the CPU 10 performs the display on the display 2 on the basis of the inputs of the Undo input processing and the Redo input processing. Further, the CPU 10 causes the projector 5 to perform the projection on the basis of the Undo input processing and the Redo input processing.

Operations and effects of print image system 100 of the embodiment In the projection image/print image creation processing, on the display 2, the CPU 10 can specify and set, as the specified area 64, a section that does not need to be printed, on the print image displayed so as to be superimposed on the background image obtained by correcting the distortion of the photographic image. The CPU 10 can create the overlap deleted print image obtained by deleting the overlapping section from the print image overlapping with the specified area 64, and can project the created overlap deleted print image onto the fabric 81. Thus, the image for printing can be easily verified, and even if the object to be printed is configured by the fabric, a time required for an operation to verify the position of the print image can be reduced. Further, there is no need to re-create the print image from which the section that does not need to be printed is deleted, and a deterioration in productivity can be reduced.

Since the white light is irradiated from the projector 5 onto the area corresponding to the specified area 64, and the overlap deleted print image is projected, on the fabric 81, the section that is not to be printed is clearly identified, and the deterioration in productivity is reduced.

Since the irradiation of the white light from the projector 5 follows the drawing of the trajectory of the specified area 64, the section that is not to be printed is clearly identified on the fabric 81, and the deterioration in productivity is reduced.

Even when the star 61D that is the print image is moved to an area separate from the specified area 64, the CPU 10 controls the display 2 such that the planar position of the specified area 64 in the background image is maintained and display is performed. Further, in the processing at step S14 also, the CPU 10 controls the projector 5 such that the planar position of the specified area 64 in the background image is maintained and the overlap deleted print image is projected onto the fabric 81. Thus, the section that is not to be printed does not move on the fabric 81, the overlap deleted print image that is to be printed is clearly identified, and the deterioration in productivity is reduced.

Even when there is the plurality of print images, the specified area 64 is automatically displayed while being superimposed on the plurality of print images, and thus, the specified area 64 is easily ascertained, and the deterioration in productivity is reduced.

Since the color of at least two of the specified areas 64 of the fabric 81 is set to be the same color, it is possible to improve operability of the color setting of the specified area 64, and the deterioration in productivity is reduced.

Since the color of the cursor trajectory is set such that the color of the cursor trajectory is different to the color of the fabric 81, and the position of the cursor trajectory is clarified, it is possible to improve operability of the cursor, and the deterioration in productivity is thus reduced.

Since at least a part of the cursor itself and the cursor trajectory are set to the same color, it is possible to improve operability of setting the color relating to the cursor, and the deterioration in productivity is thus reduced.

Since it is possible to set one of the plurality of shapes of the cursor with respect to the image of the fabric 81 and display or project the one shape, it is possible to improve the operability of the cursor. Thus, the deterioration in productivity is reduced.

In this case, since it is possible to set the thickness of the cursor trajectory displayed so as to be superimposed on the image of the object to be printed on the display 2, it is possible to change the thickness of the cursor trajectory that is displayed on the image of the object to be printed or that is projected, and visibility of the cursor trajectory can be improved. Thus, the deterioration in productivity is reduced.

When the Undo button 26 of the editing screen 21 is clicked once, the CPU 10 can return the processing by the one operation sequence, and when the Redo button 27 is clicked, the CPU 10 can advance the processing by the one operation sequence. Thus, it is possible to transit to preceding and subsequent states, and, in comparison to a case of creating from a state of nothing, the deterioration in productivity is reduced.

Since the camera 7 can capture the image of the fabric 81 that is mounted so as to be along a placement surface of the platen 39A, even if a mounting state of the fabric 81 on the platen 39A differs, it is possible to improve operation efficiency of verifying the print image on the fabric 81 along the placement surface, and the deterioration in productivity can be reduced.

There is a case in which the fabric 81 is mounted along the placement surface of the platen 39A, and the mounting state differs each time the fabric 81 is mounted. In this case also, since the fabric 81 is mounted along the placement surface of the platen 39A in a location positioned away from the base 31, it is possible to inhibit the fabric 81 from becoming contaminated by ink mist formed by ink dispersed in the air.

Even if the fabric 81 is hollow, the section that is not to be printed is set on the basis of the photographic image captured by the camera 7, at least a part of the print image is deleted and a print state is projected. Thus, the deterioration in productivity is reduced.

The camera 7 captures the image of the fabric 81 in the state in which the irradiation of the light onto the fabric 81 by the projector 5 is a predetermined irradiation or is paused. Thus, the section that is not to be printed is set, at least a part of the print image is deleted, and the print state is projected. As a result, even if the object to be printed is configured by the fabric 81, the deterioration in productivity is reduced.

Note that the present disclosure is not limited to the above-described embodiment, and various modifications are possible insofar as they do not depart from the gist and scope of the present disclosure.

For example, the CPU 10 may perform print image switching processing that switches at least one of the projection by the projector 5 relating to the print image or the display on the display 2, may perform the extraction of the planar position of the print image in the background image in the processing at step S13, and, in the processing at step S14, may cause the print image to be projected onto the fabric 81 by the projector 5 on the basis of the position of the print image extracted by the processing at step S13, and the switching performed in the print image switching processing. In this case, when the projection of the print image is necessary, the print image can be projected. Thus, the print image can be projected and the deterioration in productivity can be reduced.

Further, the CPU 10 may perform specified area switching processing that switches at least one of the projection by the projector 5 or the display on the display 2 relating to the specified area 64, may perform planar position extraction processing that extracts the planar position of a contour line of the specified area 64 in the background image at step S13, and, may perform, at step S9, at least one of displaying the specified area 64 on the display 2 on the basis of the position of the contour line extracted by the planar position extraction processing and the switching in the specified area switching processing, or causing the projector 5 to project the specified area 64 on the basis of the position of the contour line extracted by the planar position extraction processing and the switching in the specified area switching processing. In this case the contour line of the specified area 64 is displayed or projected, operability is improved, and the deterioration in productivity can be reduced.

Further, the CPU 10 may perform translucence processing in order to create translucence data causing at least one of the projection of the specified area 64 by the projector 5 to be performed in a translucent state or the display of the specified area 64 on the display 2 to be performed in a translucent state, may perform the specified area switching processing that switches at least one of the projection by the projector 5 or the display on the display 2, and may perform, in the processing at step S9, at least one of causing the specified area 64 to be displayed in the translucent state on the display 2 or, in the projection control processing, causing the projector 5 to project the specified area 64 in the translucent state, on the basis of the translucence data and the switching in the specified area switching processing. In this case, the specified area 64 in the translucent state is displayed or projected, operability is improved, and the deterioration in productivity can be reduced. Further, in the processing at step S13, the CPU 10 may add a predetermined marker image to the section over which the overlapping section of the print image of the print image layer 72 that is superimposed on the specified area 64 of the specified area layer 74 is deleted. In this case, the marker image is displayed on the display 2 of the PC 1. The marker image is a color-filled section, for example. In the processing at step S14, the CPU 10 transmits print image data excluding the marker image to the printer 30. Thus, the marker image is not printed.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

The invention claimed is:

1. A non-transitory computer-readable storage medium storing computer-readable instructions that cause a processor of a print image control device, which performs control causing image capture by an image capture device of an object to be printed supported on a support member of a printer, and causing projection from a projection device of a print image onto the object to be printed, to perform processes comprising:
   performing display control processing that displays, on a display portion, the print image superimposed on a photographic image, captured by the image capture device, of the object to be printed;
   performing specified area processing that specifies, as a specified area, a predetermined area of the photographic image displayed on the display portion;
   performing overlap deleted print image formation processing that forms an overlap deleted print image obtained by deleting an overlapping section from the print image overlapping the specified area; and
   performing projection control processing that causes the projection device to project the overlap deleted print image onto the object to be printed.

2. The non-transitory computer-readable medium storing computer-readable instructions according to claim 1, further causing the processor to perform a process comprising:
   in the projection control processing, causing the projection device to irradiate white light onto the specified area of the object to be printed, and causing the overlap deleted print image to be projected onto the object to be printed.

3. The non-transitory computer-readable medium storing computer-readable instructions according to claim 1, further causing the processor to perform a process comprising:
   in the projection control processing, causing the projection device to irradiate white light following drawing of a trajectory of the specified area onto an area corresponding to the specified area of the object to be printed, and causing the overlap deleted print image to be projected onto the object to be printed.

4. The non-transitory computer-readable medium storing computer-readable instructions according to claim 1, further causing the processor to perform processes comprising:
performing movement processing that moves the print image displayed on the display portion to an area separate from the specified area;
performing display while maintaining a planar position of the specified area in the photographic image, even when the print image is moved on the display portion by the movement processing; and
in the projection control processing, causing the projection device to project the overlap deleted print image onto the object to be printed in accordance with one of an increase and decrease of an overlap between the print image and the specified area.

5. The non-transitory computer-readable medium storing computer-readable instructions according to claim 4, further causing the processor to perform a process comprising:
in the overlap deleted print image formation processing, displaying, on the display portion, the specified area being superimposed on the photographic image and a plurality of the print images.

6. The non-transitory computer-readable medium storing computer-readable instructions according to claim 1, further causing the processor to perform processes comprising:
performing specified area color setting processing in which, when a plurality of the specified areas is specified with respect to the single photographic image, a color of at least two of the specified areas is simultaneously set to be the same color; and
performing at least one of controlling the display portion to display the specified areas using the color set by the specified area color setting processing and causing the projection device, in the projection control processing, to project the specified areas using the color set by the specified area color setting processing.

7. The non-transitory computer-readable medium storing computer-readable instructions according to claim 1, further causing the processor to perform processes comprising:
performing cursor trajectory color setting processing that, when specifying the specified area, sets a color of a trajectory of a cursor displayed being superimposed on an image of the object to be printed on the display portion; and
performing at least one of displaying, on the display portion, the trajectory of the cursor using the color set by the cursor trajectory color setting processing, and causing the projection device, in the projection control processing, to project the trajectory of the cursor using the color set by the cursor trajectory color setting processing.

8. The non-transitory computer-readable medium storing computer-readable instructions according to claim 1, further causing the processor to perform processes comprising:
performing cursor trajectory same color setting processing that, when specifying the specified area, sets at least one part of a cursor displayed being superimposed on an image of the object to be printed on the display portion, and a trajectory of the cursor to be the same color; and
performing at least one of displaying, on the display portion, the at least one part of the cursor and the trajectory of the cursor using the color set by the cursor trajectory same color setting processing, and causing the projection device, in the projection control processing, to project the at least one part of the cursor and the trajectory of the cursor using the color set by the cursor trajectory same color setting processing.

9. The non-transitory computer-readable medium storing computer-readable instructions according to claim 1, further causing the processor to perform a process comprising:
performing cursor shape setting processing that, when specifying the specified area, sets a shape of a cursor displayed being superimposed on an image of the object to be printed on the display portion; and
performing at least one of displaying, on the display portion, the cursor using the shape set by the cursor shape setting processing, and causing the projection device, in the projection control processing, to project the cursor using the shape set in the cursor shape setting processing.

10. The non-transitory computer-readable medium storing computer-readable instructions according to claim 1, further causing the processor to perform processes comprising:
performing cursor trajectory thickness setting processing that, when specifying the specified area, sets a thickness of the trajectory of the cursor displayed being superimposed on an image of the object to be printed on the display portion; and
performing at least one of displaying, on the display portion, the cursor using the thickness set by the cursor trajectory thickness setting processing, and causing the projection device, in the projection control processing, to project the cursor using the thickness set in the cursor trajectory thickness setting processing.

11. The non-transitory computer-readable medium storing computer-readable instructions according to claim 1, further causing the processor to perform processes comprising:
performing print image switching processing that switches at least one of projection by the projection device relating to the print image, and display on the display portion relating to the print image;
performing planar position extraction processing that extracts a planar position of the print image in the photographic image; and
causing the projection device, in the projection control processing, to project the print image onto the object to be printed, on the basis of the position of the print image extracted by the planar position extraction processing and the switching in the print image switching processing.

12. The non-transitory computer-readable medium storing computer-readable instructions according to claim 1, further causing the processor to perform processes comprising:
performing specified area switching processing that switches at least one of projection by the projection device relating to the specified area, and display on the display portion relating to the specified area;
performing planar position extraction processing that extracts a planar position of a contour line of the specified area in the photographic image; and
performing at least one of displaying the specified area on the display portion on the basis of the position of the contour line extracted by the planar position extraction processing and switching in the specified area switching processing, and causing the projection device, in the projection control processing, to project the specified area on the basis of the position of the contour line extracted by the planar position extraction processing and the switching in the specified area switching processing.

13. The non-transitory computer-readable medium storing computer-readable instructions according to claim 1, further causing the processor to perform processes comprising:
- performing translucence processing to create translucence data in order to perform at least one of projection, by the projection device, of the specified area in a translucent state, and display, on the display portion, of the specified area in a translucent state;
- performing specified area switching processing that switches at least one of the projection by the projection device, and the display on the display portion; and
- performing, on the basis of the translucence data and switching in the specified area switching processing, at least one of displaying the specified area in the translucent state on the display portion and causing the projection device, in the projection control processing, to project the specified area in the translucent state.

14. The non-transitory computer-readable medium storing computer-readable instructions according to claim 1, further causing the processor to perform processes comprising:
- continuously storing planar position data, in the photographic image, of each of the print image, the specified area, and the overlap deleted print image, in a storage portion, the planar position data being readable and editable, the storing including continuously storing states of a plurality of stages relating to the specified area;
- performing reading processing that reads out the position data stored in the storage portion;
- performing undo input processing in which specification of the specified area immediately preceding a current state is cancelled, information stored in the storage portion is read out by the reading processing, and a command is input to restore a state of one previous stage,
- performing redo input processing in which information stored in the storage portion is read out by the reading processing, and a command is input to return the state restored on the basis of the input in the undo input processing to the current state; and
- performing at least one of performing display, on the display portion, on the basis of inputs of the undo input processing and the redo input processing, and causing the projection device, in the projection control processing, to perform projection on the basis of the inputs of the undo input processing and the redo input processing.

15. The non-transitory computer-readable medium storing computer-readable instructions according to claim 1, further causing the processor to perform a process comprising:
- causing the image capture device provided facing the support member, which is movable with respect to the printing portion of the printer, to capture an image of the object to be printed mounted along a placement surface of the support member.

16. The non-transitory computer-readable medium storing computer-readable instructions according to claim 1, further causing the processor to perform a process comprising:
- causing the image capture device provided facing the support member that is positioned in a location separated from a base of the printer and that supports the object to be printed, to capture an image of the object to be printed mounted along a placement surface of the support member.

17. The non-transitory computer-readable medium storing computer-readable instructions according to claim 1, further causing the processor to perform a process comprising:
- causing the image capture device provided facing the support member, which supports a part of the object to be printed formed in a hollow shape, to capture an image of the object to be printed supported by the support member.

18. A print image control device that performs control causing image capture by an image capture device of an object to be printed supported on a support member of a printer, and causing projection from a projection device of a print image onto the object to be printed, the print image control device comprising:
- a control portion,
- wherein
- the control portion performs processes comprising:
  - performing display control processing that displays, on a display portion, the print image superimposed on a photographic image, captured by the image capture device, of the object to be printed;
  - performing specified area processing that specifies, as a specified area, a predetermined area of the photographic image displayed on the display portion;
  - performing overlap deleted print image formation processing that forms an overlap deleted print image obtained by deleting an overlapping section from the print image overlapping the specified area; and
  - performing projection control processing that causes the projection device to project the overlap deleted print image onto the object to be printed.

19. A control method of a print image control device that performs control causing image capture by an image capture device of an object to be printed supported on a support member of a printer, and causing projection from a projection device of a print image onto the object to be printed, the control method performing processes comprising:
- performing display control processing that displays, on a display portion, the print image superimposed on a photographic image, captured by the image capture device, of the object to be printed;
- performing specified area processing that specifies, as a specified area, a predetermined area of the photographic image displayed on the display portion;
- performing overlap deleted print image formation processing that forms an overlap deleted print image obtained by deleting an overlapping section from the print image overlapping the specified area; and
- performing projection control processing that causes the projection device to project the overlap deleted print image onto the object to be printed.

* * * * *